(No Model.)
G. H. VOLLHARDT.
VEHICLE TONGUE.
No. 412,569. Patented Oct. 8, 1889.
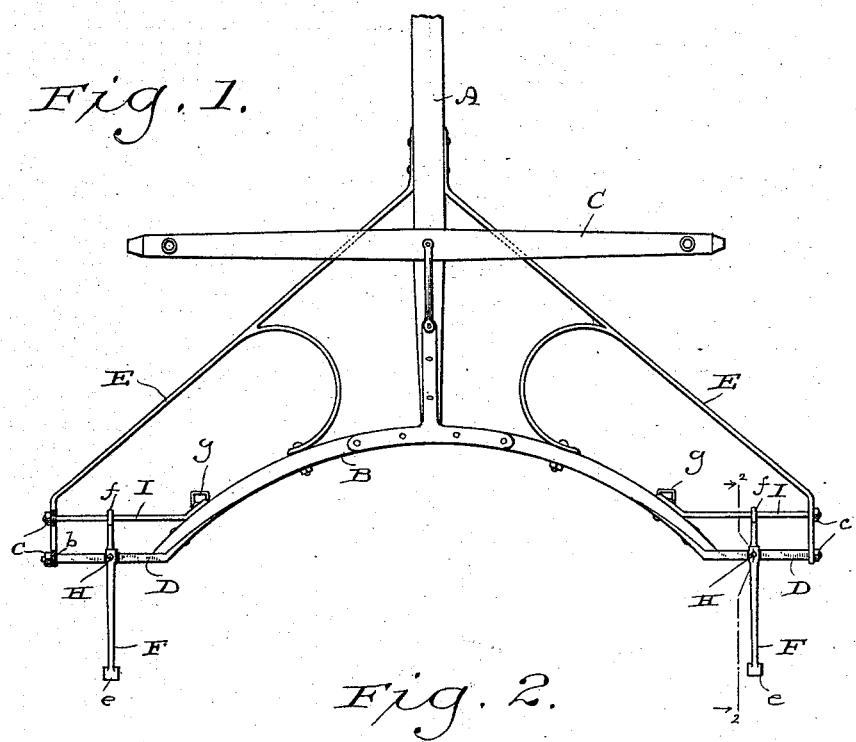
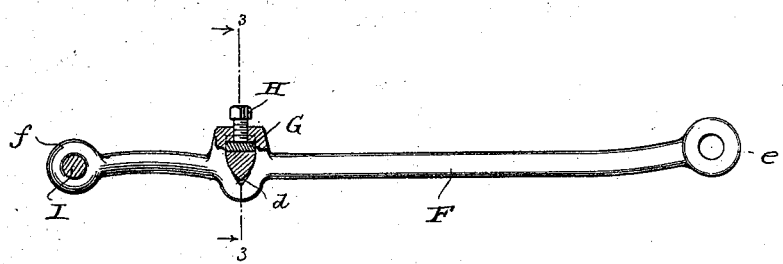
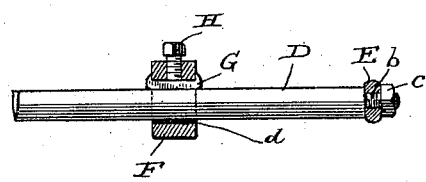
Witnesses
Geo. W. Young.
N. E. Oliphant
Inventor
George H. Vollhardt
By Stout & Underwood
Attorneys

UNITED STATES PATENT OFFICE.

GEORGE H. VOLLHARDT, OF MILWAUKEE, WISCONSIN.

VEHICLE-TONGUE.

SPECIFICATION forming part of Letters Patent No. 412,569, dated October 8, 1889.

Application filed August 9, 1889. Serial No. 320,259. (No model.)

*To all whom it may concern:*

Be it known that I, GEORGE H. VOLLHARDT, of Milwaukee, in the county of Milwaukee, and in the State of Wisconsin, have invented certain new and useful Improvements in Vehicle-Tongues; and I do hereby declare that the following is a full, clear, and exact description thereof.

My invention relates to vehicle-poles; and it consists in certain peculiarities of construction and combination of parts to be hereinafter described with reference to the accompanying drawings, and subsequently claimed.

In the drawings, Figure 1 represents a plan view of a vehicle-pole embodying my invention; Fig. 2, a detail side elevation, partly in section, on line 2 2, Fig. 1; and Fig. 3, a rear elevation, partly in section, on line 3 3, Fig. 2.

Referring by letter to the drawings, A represents a vehicle-pole provided with the usual circle-bar B and whiffletree C. Bolted or otherwise rigidly secured to the extremities of the circle-bar are lateral arms D, having reduced and screw-threaded outer ends b, that fit suitable openings in braces E, attached to the pole, and engage nuts c, as is best illustrated in Fig. 3.

The lateral arms D are preferably wedge-shaped in cross-section and engage correspondingly-shaped transverse openings d in laterally-adjustable longitudinal links F, bushings G being preferably arranged between the flat upper sides of said arms, and set-screws H, that engage the links to hold the latter in any position to which they may be adjusted.

The rear ends of the links F are provided with eyes e, for shackle-connection with the usual clips on the front axle of a vehicle, and the front ends of said links are provided with eyes f, that engage rods I, secured to the circle-bar B and braces E, parallel to the arms D, as shown in Fig. 1, said rods being provided with eyes g, for engagement with the stay chains or straps of the vehicle.

The transverse openings d in the links F are of greater depth than the arms D, and by tightening the set-screws H said links will draw up tight upon the arms D and thus compensate for any wear that may take place between the parts.

The bars I prevent the links F from twisting on the arms D, and by laterally adjusting said links the pole can be readily fitted to any width of vehicle.

Having thus described my invention, what I claim as new, and desire to secure by Letters Patent, is—

1. A vehicle-pole, circle-bar, and braces, in combination with lateral arms uniting the opposing ends of the circle-bar and braces, longitudinal links adjustable on the arms, and rods extended from said circle-bar through the forward portion of the links and connected to the braces, substantially as set forth.

2. A vehicle-pole, circle-bar, and braces, in combination with lateral arms wedge-shaped in cross-section, arranged to unite the opposing ends of the circle-bar and braces, longitudinal links provided with wedge-shaped openings for engagement with the arms, but of greater depth than the latter, and set-screws for clamping the links in any position to which they may be adjusted on said arms, substantially as set forth.

3. A vehicle-pole, circle-bar, and braces, in combination with lateral arms wedge-shaped in cross-section, arranged to unite the opposing ends of the circle-bar and braces, longitudinal links provided with wedge-shaped openings for engagement with the arms, set-screws for clamping the links in any position to which they may be adjusted on said arms, and rods extended from said circle-bar through the forward portion of said links and connected to the braces, substantially as set forth.

4. A vehicle-pole, circle-bar, and braces, in combination with lateral arms uniting the opposing ends of the circle-bar and braces, longitudinal links adjustable on the arms, and rods extended from said circle-bar through the forward portion of the links to connect with the braces, and provided with eyes for stay chains or straps, substantially as set forth.

5. A vehicle-pole, circle-bar, and braces, in combination with the lateral arms D, uniting the opposing ends of the circle-bar and braces, the links F, adjustable on the arms, the set-screws H, engaged by the links, and the bushings G, inserted between said arms and screws, substantially as set forth.

In testimony that I claim the foregoing I have hereunto set my hand, at Milwaukee, in the county of Milwaukee and State of Wisconsin, in the presence of two witnesses.

GEO. H. VOLLHARDT.

Witnesses:
N. E. OLIPHANT,
WM. KLUG.